J. A. Whitney.
Horse Hay Fork.
Nº 43939.        Patented Aug. 23, 1864.
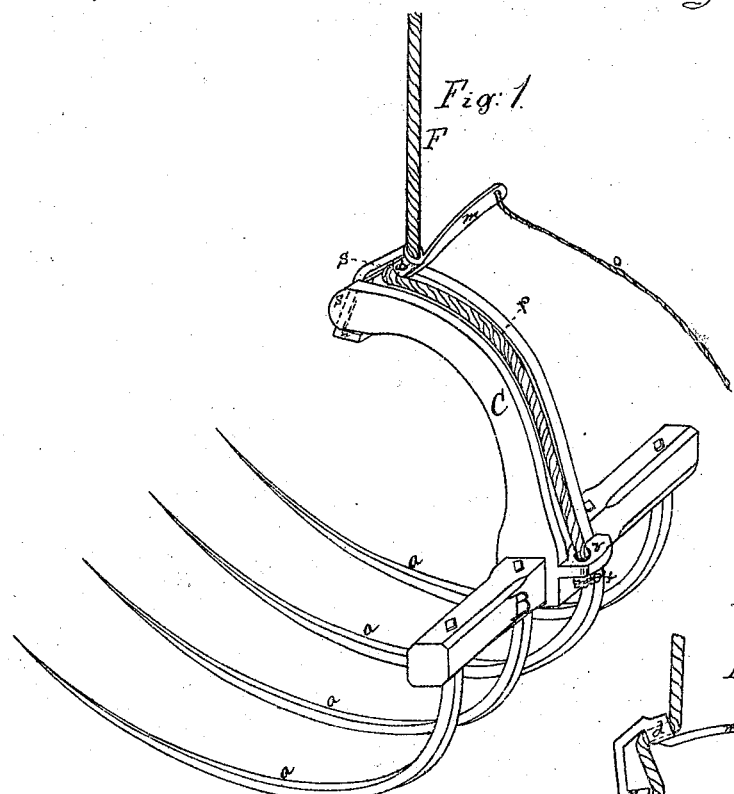
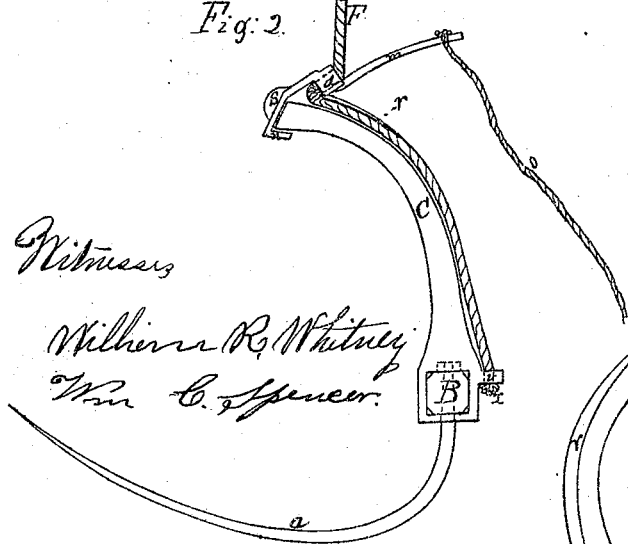
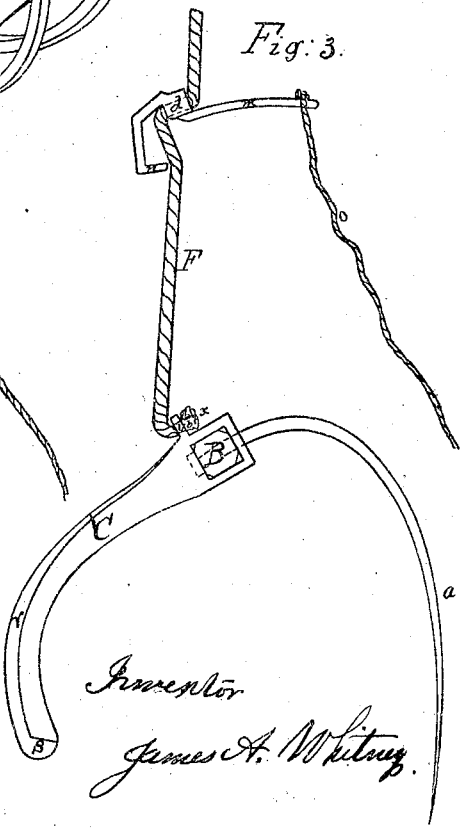
Witness
William R. Whitney
Wm. C. Spencer.
Inventor
James A. Whitney

UNITED STATES PATENT OFFICE.

JAMES A. WHITNEY, OF MARYLAND, NEW YORK.

IMPROVEMENT IN HAY-ELEVATING FORKS.

Specification forming part of Letters Patent No. 43,939, dated August 23, 1864.

*To all whom it may concern:*

Be it known that I, JAMES A. WHITNEY, of Maryland, in the county of Otsego and State of New York, have invented a new and useful Improvement in Horse Hay-Forks; and I do hereby declare that the following is a full, clear, and exact description of the construction and operation of the same, reference being had to the annexed drawings, making a part of this specification, in which—

Figure 1 is a perspective view, representing the apparatus in position for lifting the hay. Fig. 2 is a side sectional view showing the apparatus in the same position as in Fig. 1. Fig. 3 is a side sectional view showing the position of the apparatus when the fork is tilted to discharge its load.

The object of this invention is to obtain a hay-elevator in which the bail usually employed in such devices is dispensed with, the invention consisting in so applying the draft or lifting rope to the fork that the desired object is accomplished, all as will be hereinafter fully described.

To enable those skilled in the art to make and use my invention, I will proceed to describe it.

The tines $a$ of the fork are secured in the head B in the usual manner. At the center of the head B is secured the tongue C, which may be made of malleableized cast-iron, and which projects upward and somewhat over the tines $a$, as shown in the drawings. At the lower end of this tongue C, and close to the head B, is a small flat spur, $v$, which projects backward, and has a hole through it, through which the lower end of the draft-rope F is passed and secured to the said spur by having a knot, $x$, tied in it under the said spur. At the upper end of the tongue C are two lips, $s\ s$—one at each side—which project out from the said end, and in the back of the said tongue there is a longitudinal groove, $r$.

The draft-rope F is provided with a catch, marked $n\ d\ m$ in the drawings, and placed at a suitable distance from the lower end of the said rope. One end of this catch is formed into a hook, $n$, which hooks over the end of the tongue C, between the lips $s\ s$, during the operation of lifting the hay, the lips $s\ s$ serving to keep the said hook from slipping off sidewise. The opposite end of the catch is extended to form an arm or lever, $m$, to which the tripping-cord $o$ is attached. Now, then, the end of the draft-rope F being attached to the spur $v$, as described, the said rope is passed lengthwise of the tongue C, and lies in the groove $r$. The catch $d\ n\ m$, being attached to the draft-rope F at the proper place, has its hook $n$ placed over the end of the tongue C, as before mentioned, by which means that portion of the draft-rope F which is below the catch $n\ d\ m$ is confined close to the tongue C, and the fork is suspended from the upper end of the said tongue. The stem $d$ of the catch $n\ d\ m$ is hollow or tubular, and the draft-rope F, being passed through the same, is firmly secured thereto either by wedges or rivets. It will be noticed that, the stem $d$ of the said catch being lengthwise of the rope F, the strain on the said rope in lifting will have a tendency to retain the hook $n$ in its hold on the end of the tongue C until the catch is operated by pulling downward on the arm $m$.

Such being the construction of the invention, it is evident that its operation will be as follows: The tines $a$ being inserted in the hay to be lifted, and the hook $n$ being hooked over the end of the tongue C, as described, the lifting-power is applied by means of the usual appliances, and the mass is elevated to the required height. The tripping-cord $o$ is then pulled downward, which depresses the arm $m$ of the catch $n\ d\ m$, and of course disengages the hook end from the end of the tongue C, thus changing the point of suspension from the upper end of the tongue C to the spur $v$, on which the weight of the load, together with that of the fork itself, tilts the fork, and thus discharges the load.

I do not claim pivoting the head of a hay-elevating fork to a bail or handle, the object of my invention being to dispense with such pivoted bail or handle altogether; but,

Having thus described my said invention, what I claim as new, and desire to secure by Letters Patent, is—

Attaching the draft-rope F directly to the fork at or near its head B, when the said rope operates in connection with the tongue C, rigidly secured to the head B, and with a catch, $n\ d\ m$, or its equivalent, as shown, whereby I am enabled to dispense with the bail usually employed in such devices, all for the purpose and in the manner substantially as herein set forth and described.

JAMES A. WHITNEY.

Witnesses:
WILLIAM R. WHITNEY,
WM. C. SPENCER.